(12) United States Patent
Kensicher et al.

(10) Patent No.: US 7,632,574 B2
(45) Date of Patent: Dec. 15, 2009

(54) METHOD OF CROSS-LINKING A FILLED POLYMER BASED ON POLYETHYLENE

(75) Inventors: Christele Kensicher, Lyons (FR); Linda Boudiaf, Grigny (FR)

(73) Assignee: Nexans, Paris (FR)

( * ) Notice: Subject to any disclaimer, the term of this patent is extended or adjusted under 35 U.S.C. 154(b) by 371 days.

(21) Appl. No.: 11/582,853

(22) Filed: Oct. 18, 2006

(65) Prior Publication Data

US 2007/0154730 A1    Jul. 5, 2007

(30) Foreign Application Priority Data

Jan. 4, 2006    (FR) .................................. 06 50030

(51) Int. Cl.
*H01B 3/28* (2006.01)

(52) U.S. Cl. ........................ 428/523; 428/500; 528/17; 528/35; 174/110 R; 174/110 PM

(58) Field of Classification Search ........................ None
See application file for complete search history.

(56) References Cited

U.S. PATENT DOCUMENTS

| 4,549,041 | A | 10/1985 | Shingo et al. ................ 174/113 |
| 6,465,547 | B1 * | 10/2002 | Jackson et al. ................ 524/71 |
| 6,936,655 | B2 * | 8/2005 | Borke et al. ................. 524/521 |
| 2002/0183412 | A1 | 12/2002 | Harlin et al. ................... 522/60 |
| 2002/0197471 | A1 | 12/2002 | Barnes et al. ................ 428/343 |
| 2005/0049343 | A1 | 3/2005 | Borke et al. ................. 524/366 |
| 2006/0079605 | A1 * | 4/2006 | Sato et al. .................... 523/176 |
| 2006/0223952 | A1 * | 10/2006 | Furrer et al. ............. 525/333.7 |
| 2007/0282088 | A1 | 12/2007 | Chaussade et al. ............ 528/18 |

FOREIGN PATENT DOCUMENTS

| EP | 0245938 | 11/1987 |
| EP | 0849745 | 6/1998 |
| EP | 1502923 | 2/2005 |
| GB | 1486952 | 9/1977 |
| WO | 9724023 | 7/1997 |
| WO | 9724401 | 7/1997 |
| WO | WO 2004/074330 A1 * | 9/2004 |
| WO | WO 2005/071007 * | 4/2005 |
| WO | WO 2007/032885 A2 * | 3/2007 |

OTHER PUBLICATIONS

French Search Report—Mar. 31, 2005.
European Search Report—Dec. 6, 2006.

* cited by examiner

*Primary Examiner*—Marc S Zimmer
(74) *Attorney, Agent, or Firm*—Sofer & Haroun, LLP

(57) ABSTRACT

A method of cross-linking a composition comprising firstly a polyethylene-based silane-grafted polymer, and secondly a filler. The invention is remarkable in that the cross-linking method consists in mixing the composition with a condensation catalyst constituted by lauryl stannoxane of formula $[(C_4H_9)_2Sn(OOCC_{11}H_{23})]_2O$.

10 Claims, No Drawings

METHOD OF CROSS-LINKING A FILLED POLYMER BASED ON POLYETHYLENE

RELATED APPLICATION

This application is related to and claims the benefit of priority from French Patent Application No. 06 50030, filed on Jan. 4, 2006, the entirety of which is incorporated herein by reference.

FIELD OF THE INVENTION

The present invention relates to a method of cross-linking a composition associating a polyethylene-based silane-grafted polymer with a filler of any kind.

A particularly advantageous, but non-exclusive application of the invention lies in the field of insulating materials for power and/or telecommunications cables.

BACKGROUND OF THE INVENTION

Polyethylene is known for presenting excellent dielectric properties, and also low cost price. That is why it is nowadays in widespread use for making insulating layers of power and/or telecommunications cables.

In order to provide improved thermomechanical properties, polyethylene is generally used in a cross-linked form. It is known that establishing a lattice of chemical bonds extending in all three dimensions serves to increase the high temperature behavior of this particular type of insulating material.

Cross-linked polyethylene is usually fabricated by silane cross-linking. That now-conventional technique consists initially in grafting the base polyethylene with a silane, by adding radicals using a peroxide. Thereafter, the compound as grafted in that way is subjected to cross-linking by hydrolysis and then to condensation, which requires the presence of water and a condensation catalyst. It should be observed that the catalyst is commonly constituted either by dibutyl tin laurate (DBTL) or by dibutyl tin dilaurate (DBTDL).

With a polyethylene, the silane cross-linking technique nevertheless presents the drawback of being unsuitable for being implemented directly in ambient air if said polyethylene is filled. Unfortunately, in cable making, it is extremely common practice for insulating materials to include fillers. This applies in particular to flame-retardant fillers for improving the behavior of power cables and/or telecommunications cables in the event of fire.

In order to remedy that difficulty, the only solutions presently in use consist in implementing the second cross-linking step of the silane technique either in a pool for 24 hours (h) at 63° C., or else in a sauna for 15 h at 90° C.

Nevertheless, both of those solutions are particularly expensive because of the cost of the extra equipment that is needed, because of the cost of the energy required for operation, and because of the cost of maintaining the installation.

Furthermore, since marking inks do not withstand passing through a pool or a sauna, it is not possible to mark each cable directly on leaving an extruder, and the marking operation must necessarily be performed as an extra operation on leaving the bath of liquid water or of steam. Thus, a consequence of using a pool or a sauna is to complicate quite considerably the industrial fabrication method in terms of logistics, and that again constitutes more extra costs.

OBJECT AND SUMMARY OF THE INVENTION

Thus, the technical problem to be solved by the subject matter of the present invention is to propose a method of cross-linking a composition comprising both a polyethylene-based silane-grafted polymer and a filler, which cross-linking method makes it possible to avoid prior art problems, in particular by being substantially less complicated to implement and thus implicitly being less expensive.

According to the present invention, the solution to the technical problem posed lies in the fact that the cross-linking method consists in mixing the composition with a condensation catalyst constituted by lauryl stannoxane having the following formula

$[(C_4H_9)_2Sn(OOCC_{11}H_{23})]_2O$.

It should be understood that the term "silane-grafted polymer" conventionally designates a polymer on which a silane type compound has previously been grafted.

The concept of a "polyethylene-based polymer" relates to any low, medium, or high density polyethylene, and also any polyethylene-octene elastomer (POE), and regardless of the polymerization system involved.

Furthermore, it should be observed that the filler could, a priori, be of absolutely any kind.

The invention as defined presents the advantage of enabling a filled polyethylene to be cross-linked in ambient air and in a few days, with complete cross-linking being achieved within a period of less than 45 days. It is thus entirely appropriate to speak of self-cross-linking.

Consequently, the invention makes it possible to abandon the expensive and complicated step of passing through a pool or a sauna, and thus to eliminate the corresponding equipment. Independently of the purely monetary financial advantage associated with such omission, the resulting saving in time that results also serves to improve productivity.

Because of the self-cross-linking, cables can advantageously be marked continuously, directly at the outlet from an extruder. This also leads to a gain in productivity.

Furthermore, the use of a new catalyst does not require significant change to the overall industrial process of cable fabrication, and thus does not require significant change to the installations presently in use. In other words, this means that the cross-linking method of the invention can be implemented very easily using existing fabrication equipment.

According to a feature of the invention, the condensation catalyst is packaged in the form of a master batch.

This characteristic enables the lauryl stannoxane to be better dispersed within the batch, thereby achieving significantly greater effectiveness. For equivalent effect, it is consequently possible to use significantly less catalyst, thus implying a significant saving in terms of cost.

Packaging the lauryl stannoxane in the form of a master batch also makes it possible to measure out accurately the quantity of catalyst that is really necessary, which can be particularly advantageous given that the catalyst is liquid and is for use in very small quantities.

In particularly advantageous manner, the master batch comprises a polymer matrix having the lauryl stannoxane dispersed therein.

This naturally assumes that the polymer matrix of the catalyst master batch is compatible with the base polymer of the composition.

The polymer matrix of the master batch is preferably identical in nature with the base polymer of the composition.

This characteristic makes it possible in particular to avoid modifying the mechanical and dielectric properties of the final material.

In accordance with another advantageous feature, the composition contains 0.0036% to 0.0108% of condensation catalyst.

According to another advantageous characteristic, the composition contains 90 pcr to 190 pcr of filler.

In this respect, it should be understood that throughout this specification, the abbreviation "pcr" has the conventional meaning of percent of resin. Consequently, it designates the percentage by weight of a compound in question relative to the weight of the base polymer set arbitrarily as being 100.

According to another feature of the invention, the composition is also provided with at least one additive selected from a processing agent, an anti-oxidant, a colorant, an anti-UV agent, an anti-copper agent.

In particularly advantageous manner, the composition contains less than 3 pcr of processing agent.

According to another advantageous characteristic, the composition includes 0.5 pcr to 5 pcr of anti-oxidant.

According to another feature of the invention, the cross-linking method is implemented at ambient temperature.

According to another advantageous characteristic of the invention, the cross-linking method is implemented in ambient air.

Naturally, the invention also relates to any power and/or telecommunications cable including at least one insulating covering that is made from a composition cross-linked in application of the above-described method.

DESCRIPTION OF THE INVENTION

Other characteristics and advantages of the present invention appear from the following description of two comparative examples, said examples being given by way of non-limiting illustration.

The object of each of these Examples I and II is to compare the level of cross-linking in two identical filled polymer materials when left to cross-link in the open air, one of the materials including a condensation catalyst in accordance with the invention, and the other having only a prior art catalyst.

EXAMPLE I

Preparation of Samples

Two samples of materials A and B were prepared from two compositions that thus differed from each other solely in the nature of their respective condensation catalysts.

Specifically, the various ingredients for each of the compositions A and B were mixed, the resulting mixture was extruded, and the corresponding extruded sample was allowed to cross-link in the open air. It should be observed that in each case the condensation catalyst was added during extrusion, in the form of a master batch.

Table 1 below gives the respective compositions of the two material samples A and B.

TABLE 1

| | Sample | |
|---|---|---|
| | A | B |
| Silane-grafted polymer (pcr) | 100 | 100 |
| Filler (pcr) | 110 | 110 |
| Processing agent (pcr) | 3 | 3 |
| Anti-oxidant (pcr) | 1 | 1 |
| DBTL (%) | 0.072 | — |
| Lauryl stannoxane (%) | — | 0.072 |

It should be observed that the silane-grafted polymer in this first example was constituted by a linear low-density polyethylene grafted to 1% with a silane cocktail, which cocktail associated a peroxide and silane. Specifically, it was the composition sold under the name "CLDO" by the supplier Polimeri Europa.

The filler was of the flame-retardant type, being constituted by aluminum trihydroxide (ATH).

The DBTL used in sample A was as sold by the supplier Goldschmidt, under the reference Tegokat 218.

The lauryl stannoxane used in its sample B was as sold by the supplier Goldschmidt, under the reference Tegokat 225.

Hot-Set Test Under Mechanical Stress at 200° C.

In order to verify that each sample A and B had indeed cross-linked, it was subjected to a standardized hot-set test (HST) under mechanical stress.

That type of test is governed by the standard NF EN 60811-2-1. Specifically, it consists in loading one end of a dumbbell H2 type test piece with a mass corresponding to applying stress equivalent to 0.2 megapascals (MPa), and in placing the assembly in an oven that is heated to a given reference temperature to within ±2° C. for a duration of 15 minutes (min). After that time, the elongation of the test piece while hot and under stress is measured as a percentage. The suspended mass is then removed, and the test piece is kept in the oven for five more minutes. The permanent elongation that remains, also known as remanence, is then measured and expressed in percentage.

The greater the extent to which a material is cross-linked, the smaller the values of elongation and of remanence. Furthermore, in the event of a test piece breaking during the test or in the event of its elongation exceeding 100%, under the combined effects of mechanical stress and temperature, then the result of the test is logically considered as being a failure.

The results of the hot-set tests under mechanical stress at 200° C. are summarized in Table 2 below.

TABLE 2

| | Sample | |
|---|---|---|
| | A | B |
| Hot-set test (200° C.) | failure | success |
| Time | D + 36 | D + 15 |
| Elongation (%) | — | 50 |
| Remanence (%) | — | 10 |

It should be observed firstly that only sample B was successful in passing the hot-set test at 200° C., and was capable of so doing after 15 days only. This means that only the catalyst of the invention is capable of enabling the filled polyethylene to self-cross-link in open air.

In contrast, it can be seen that sample A was not capable of passing the hot-set test at 200° C. successfully, even after 36 days. This confirms the known fact that a typical prior art catalyst is not capable of generating fast cross-linking in a filled polyethylene.

EXAMPLE II

Preparation of the Samples

The two material samples C and D of the second example were prepared in a manner analogous to that described above for Example I.

Table 3 specifies the respective compositions of the samples in question.

TABLE 3

|  | Sample | |
| --- | --- | --- |
|  | C | D |
| Silane-grafted polymer (pcr) | 100 | 100 |
| Filler (pcr) | 110 | 110 |
| Processing agent (pcr) | 3 | 3 |
| Anti-oxidant (pcr) | 3 | 3 |
| DBTL (%) | 0.0036 | — |
| Lauryl stannoxane (%) | — | 0.0036 |

The major difference compared with the first example comes from the specific nature of the silane-grafted polymer common to samples C and D. Specifically, it was a polyethylene octene grafted to 3% with a silane cocktail, which in this example likewise associated a peroxide and a silane. Specifically, the composition sold under the name "Exact8203/LL4004(70/30)" from the supplier Exxon was used.

The filler was still of the flame-retardant type, and specifically was still constituted by aluminum trihydroxide (ATH).

The DBTL and the lauryl stannoxane used respectively in samples C and D were identical in kind to those used respectively in samples A and B.

Hot-Set Test Under Mechanical Stress at 200° C.

Samples C and D were subjected to the same hot-set test under mechanical test as in Example I. The results of the various tests are summarized in Table 4 below.

TABLE 4

|  | Sample | |
| --- | --- | --- |
|  | C | D |
| Hot-set test (200° C.) | failure | success |
| Time (days) | D + 27 | D + 20 |
| Elongation (%) | — | 60 |
| Remanence (%) | — | 0 |

The conclusions are entirely similar to those formulated for Example I.

It can thus be seen that only sample D was successful in passing the hot-set test at 200° C., and it could do so after only 20 days. This confirms the fact that only a catalyst in accordance with the invention is capable of causing a filled polyethylene to self-cross-link in the open air.

It should also be observed that sample C was not capable of passing the hot-set test at 200° C. successfully, even after 27 days. This is further proof that a typical catalyst of the prior art cannot lead to rapid self-cross-linking of a filled polyethylene.

What is claimed is:

1. A method of manufacturing a power and/or telecommunications cable, including at least one insulating covering, said method comprising the steps of:
   mixing a composition comprising firstly a polyethylene-based silane-grafted polymer and secondly a filler with a condensation catalyst constituted by lauryl stannoxane of formula $[(C_4H_9)_2Sn(OOCC_{11}H_{23})]_2O$,
   extruding the composition obtained from the preceding step, and
   crosslinking the extruded composition in the open air in order to form the insulating covering.

2. A method according to claim 1, wherein the condensation catalyst is packaged in the form of a master batch.

3. A method according to claim 2, wherein the master batch comprises a polymer matrix having lauryl stannoxane dispersed therein.

4. A method according to claim 3, wherein the polymer matrix of the catalyst master batch is of nature identical to that of the base polymer of the composition.

5. A method according to claim 1, wherein the composition includes 0.0036% to 0.0108% of condensation catalyst.

6. A method according to claim 1, wherein the composition includes 90 pcr to 190 pcr of filler.

7. A method according to claim 1, wherein the composition further includes at least one additive selected from the group consisting of a processing agent, an anti-oxidant, a colorant, an anti-UV agent, an anti-copper agent.

8. A method according to claim 1, wherein the composition includes less than 3 pcr of processing agent.

9. A method according to claim 1, wherein the composition includes 0.5 pcr to 5 pcr of anti-oxidant.

10. A method according to claim 1, the crosslinking step being implemented at ambient temperature.

* * * * *